United States Patent Office 2,919,991
Patented Jan. 5, 1960

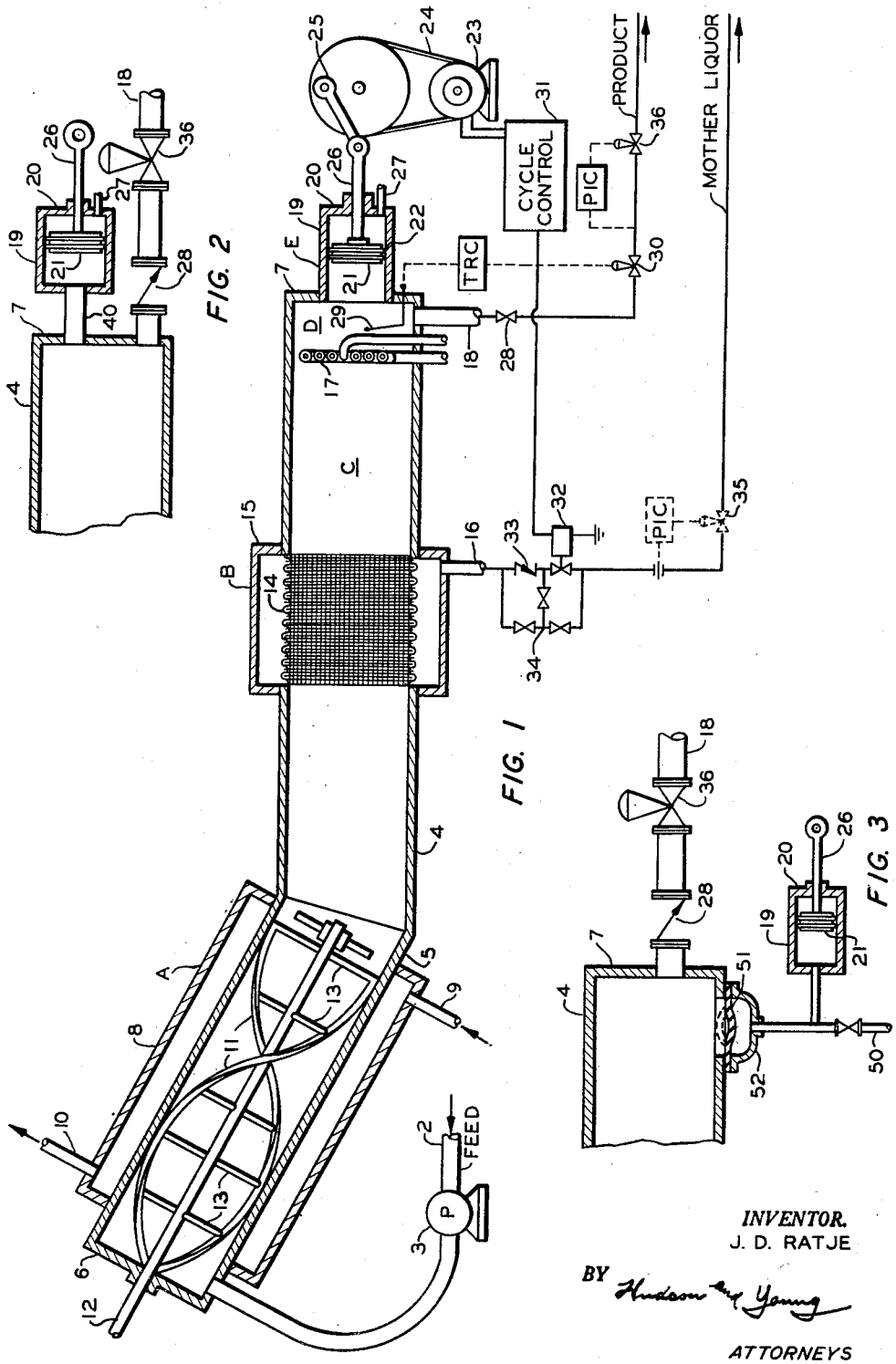

2,919,991
METHOD OF CONTROLLING CRYSTAL PURIFICATION PROCESS AND APPARATUS THEREFOR

John D. Ratje, Phillips, Tex., assignor to Phillips Petroleum Company, a corporation of Delaware Application June 10, 1955, Serial No. 514,499

15 Claims. (Cl. 99—205)

This invention relates to a process for the resolution of mixtures by crystallization. In one of its aspects, it relates to a control system for use with crystal purification apparatus. In another of its aspects, it relates to a method for controlling the operation of crystal purification apparatus.

Purification by means of fractional crystallization has been known for a number of years. Schmidt Re. 23,810 (1954) discloses a process and apparatus for purifying crystals, which process involves moving a mixture of crystals and adhering liquid through a liquid removal zone, a reflux zone and a melting zone, removing liquid in said liquid removal zone, melting crystals in said melting zone, withdrawing part of the melt as product and forcing another part of the melt in a direction countercurrent to the movement of crystals in said reflux zone. This process is generally applicable to the separation of at least one pure component from any mixture which is resolvable into its components by fractional crystallization. For example, the process can be used for the concentration of fruit juices, vegetable juices, and other materials which comprise aqueous solutions which can be concentrated by the formation and removal of ice crystals. The process is also of great value in the resolution of non-aqueous mixtures, an example of such an application being the separation of para-xylene from a mixture thereof with the other xylene isomers and ethyl benzene.

More recently, there has been proposed a process and apparatus for effecting a separation of the type described at higher throughput rates, improved stability and ease of operation, and improved heat distribution. In addition, products of high purity are obtainable over long periods of operation. In accordance with this invention, in a process wherein solids are countercurrently contacted with a reflux liquid in a purification zone, the solids in said zone are contacted with an intermittent flow of reflux liquid simultaneously with the propulsion of the solids through said zone. This invention is fully disclosed and claimed in copending U.S. application Serial No. 494,866, filed on March 17, 1955, now U.S. Patent No. 2,854,494, granted September 30, 1958, by R. W. Thomas, and the disclosure of this latter application is hereby incorporated by reference into the instant application. In accordance with the instant application, a novel control system is provided for use in combination with the crystal purification apparatus disclosed in the Thomas application.

The following are objects of the invention.

It is an object of the present invention to provide an improved process for the separation and purification of components of liquid multi-component mixtures.

Another object of the invention is to provide improved crystal purification apparatus.

Still another object of the invention is to provide an improved method for controlling the operation of crystal purification apparatus.

A further object of the invention is to provide a control system for use in combination with crystal purification apparatus.

A still further object of the invention is to provide a method for controlling the purity of the product recovered from crystal purification apparatus.

Yet a further object of the invention is to provide a method for controlling the rate of product withdrawal from crystal purification apparatus.

Still other objects and advantages of the invention will become apparent to those skilled in the art upon reference to the accompanying disclosure.

Broadly speaking, the instant invention resides in improved crystal purification apparatus and in a method for controlling the operation of such apparatus. In accordance with one embodiment of the invention, there is provided, in a process which comprises moving a mass of solids, together with adhering liquid, through a liquid removal zone, then through a reflux zone and into a melting zone, withdrawing liquid in said liquid removal zone, melting at least part of said solids in said melting zone, removing part of the melt from said melting zone, forcing another part of said melt into said reflux zone in a direction countercurrent to the movement of solids therethrough and contacting the solids in said zones with an intermittent flow of reflux liquid simultaneously with the propulsion of said solids through said zones, the improvement which comprises maintaining a predetermined back pressure on the liquid withdrawn from said liquid removal zone, and controlling the rate at which melt is removed from said melting zone so as to maintain a predetermined temperature within said melting zone.

According to another embodiment of the invention, there is provided, in an apparatus comprising a purification chamber, liquid-solid separation means in said chamber, liquid withdrawal means connected to said separation means, melting means positioned in one end of said chamber, means for moving solids into said separation means and thence toward said melting means, means for removing melt from said chamber, and means for producing an intermittent fluid flow in a direction from said melting means toward said liquid-solid separation means, the improvement which comprises means for maintaining a predetermined back pressure on the liquid in said liquid withdrawal means and means for controlling the rate of removal of melt from said chamber in accordance with a predetermined temperature of liquid adjacent said melting means.

The process and apparatus of this invention are applicable to a vast number of simple binary and complex multi-component systems. The invention is particularly applicable to the separation of hydrocarbons which have practically the same boiling points and are, therefore, difficult to separate by distillation. Where high boiling organic compounds are concerned, separation by distillation is often undesirable because many such compounds are unstable at high temperatures. One particularly advantageous application of the process lies in the purification of a component of, for example, 15 to 25 percent purity so as to effect a purity of 98 percent or higher. In order to illustrate some of the systems to which the invention is applicable, the following compounds are grouped with respect to their boiling points:

| Group A | B.P., °C. | F.P., °C. |
|---|---|---|
| Benzene | 80 | 5.5 |
| n-Hexane | 69 | −94 |
| n-Heptane | 98.52 | −90.5 |
| Carbon Tetrachloride | 77 | −22.8 |
| Acrylonitrile | 79 | −82 |
| Ethyl Alcohol | 78.5 | −117.3 |
| 2,2-Dimethylpentane | 79 | −125 |
| 2,3-Dimethylpentane | 86 | |
| Methyl ethyl ketone | 79.6 | −86.4 |
| Methylpropionate | 79.9 | −87.5 |
| Methyl acrylate | 80.5 | |
| 1,3-Cyclohexadiene | 80.5 | −98 |
| 2,4-Dimethylpentane | 80.8 | −123.4 |
| 2,2,3-Trimethylbutane | 80.9 | −25 |
| Cyclohexane | 81.4 | 6.5 |
| Acetonitrile | 82 | −42 |
| Cyclohexene | 83 | −103.7 |
| 2-Methylhexane | 90 | −119 |
| 3-Methylhexane | 89.4 | −119.4 |

| Group B | B.P., °C. | F.P., °C. |
|---|---|---|
| Methyl cyclohexane | 100.3 | −126.3 |
| Cyclohexane | 81.4 | 6.5 |
| n-Heptane | 98.52 | −90.5 |
| 2,2,4-Trimethylpentane (isooctane) | 99.3 | −107.4 |
| Nitromethane | 101 | −29 |
| p-Dioxane | 101.5 | 11.7 |
| 2-Pentanone | 101.7 | −77.8 |
| 2-Methyl-2-butanol | 101.8 | −11.9 |
| 2,3-Dimethylpentane | 89.4 | |
| 3-Ethylpentane | 93.3 | −94.5 |

| Group C | B.P., °C. | F.P., °C. |
|---|---|---|
| Toluene | 110.8 | −95 |
| Methylcyclohexane | 100.3 | −126.3 |
| 2,2,3,3-Tetramethyl butane | 106.8 | 104 |
| 2,5-Dimethylhexane | 108.25 | −91 |
| 2,4-Dimethylhexane | 110 | |
| 2,3-Dimethylhexane | 113.9 | |
| 3,4-Dimethylhexane | 116.5 | |
| 3-Ethyl-2-methylpentane | 114 | |
| 3-Ethyl-3-methylpentane | 119 | |

| Group D | B.P., °C. | F.P., °C. |
|---|---|---|
| Aniline | 184.4 | −6.2 |
| Toluene | 110.8 | −95 |
| Benzene | 80.0 | 5.5 |

| Group E | B.P., °C. | F.P., °C. |
|---|---|---|
| Carbon tetrachloride | 77 | −22.8 |
| Chloroform | 61 | −63.5 |
| CS₂ | 46.3 | −108.6 |
| Acetone | 56.5 | −95 |

| Group F | B.P., °C. | F.P., °C. |
|---|---|---|
| Ortho-xylene | 144 | −27.1 |
| Meta-xylene | 138.8 | −47.4 |
| Para-xylene | 138.5 | 13.2 |

| Group G | B.P., °C. | F.P., °C. |
|---|---|---|
| Ortho-cymene | 175.0 | −73.5 |
| Meta-cymene | 175.7 | <−25 |
| Para-cymene | 176.0 | −73.5 |

| Group H | B.P., °C. | M.P., °C. |
|---|---|---|
| Dimethyl phthalate | 282 | 5.5 |
| Dimethyl isophthalate | 124 (12 mm.) | 67 |
| Dimethyl terephthalate | 288 | 140.6 |

| Group I | B.P., °C. | M.P., °C. |
|---|---|---|
| Ortho-nitrotoluene | 222.3 | α −10.6 / β −4.1 |
| Meta-nitrotoluene | 231 | 15.5 |
| Para-nitrotoluene | 238 | 51.3 |

Mixtures consisting of any combination of two or more of the components within any one of the groups can be resolved by the process of the invention, as can mixtures made up of components selected from different groups; for example, benzene can be separated from a benzene-n-hexane or a benzene-n-heptane mixture in which the benzene is present in an amount greater than the eutectic concentration. In the same manner, paraxylene can be readily separated from a mixture of para- and meta-xylenes or from para-, meta-, or ortho-xylenes. Benzene can also be separated from a mixture thereof with toluene and/or aniline. Multi-component mixtures which can be effectively resolved so as to recover one or more of the components in substantially pure form include mixtures of at least two of 2,2-dimethylpentane, 2,4-dimethylpentane, 2,2,3-trimethylbutane, methyl cyclohexane, 2,2,4-trimethylpentane, and mixtures of at least two of carbon tetrachloride, chloroform, and acetone. The invention is also applicable to the separation of individual components from a system of cymenes.

This invention can also be utilized to purify naphthalene, hydroquinone (1,4-benzenediol), paracresol, para-dichlorobenzene, and such materials as high melting waxes, fatty acids, and high molecular weight normal paraffins. The invention can also be used to resolve a mixture comprising anthracene, phenanthrene, and carbazole. Furthermore, the invention can be used to separate durene (1,2,4,5-tetramethylbenzene) from $C_{10}$ aromatics. In cases where the material to be purified has a relatively high crystallization point, the impure material is raised to a temperature at which only a portion of the mixture is in a crystalline state, and the resulting slurry is handled at such a temperature that operation is as described in connection with materials which crystallize at lower temperatures.

It is not intended, however, to limit the invention to organic mixtures, but rather it is applicable to inorganic mixtures as well, and offers a practical method of separating two inorganic components between which solvates or hydrates are formed. Examples of inorganic systems to which this invention is applicable are those for the recovery of pure salts, such as ammonium nitrate, and of anhydrous salts from their hydrates.

In certain cases, it is also desirable to recover mother liquor separated from the crystals as a product of the process. This situation arises where it is desired to increase the concentration of a dilute solution. This aspect of the invention is especially applicable to the production of concentrated food products which involves primarily the removal of water from these products. Accordingly, by utilizing the process of this invention, water can be removed from fruit juices such as grape, orange, lemon, pineapple, apple, tomato, etc. It is also possible to concentrate vegetable juices and beverages such as milk, beer, wine, coffee or tea by this method.

A clearer understanding can be obtained by referring to the following disclosure of the drawing in which:

Figure 1 illustrates one embodiment of the invention which utilizes a reciprocating piston and which includes the temperature control system of the invention;

Figure 2 illustrates a modification of the apparatus of Figure 1; and

Figure 3 illustrates a further modification wherein a flexible diaphragm is utilized.

Corresponding numerals indicate corresponding parts in each of the three figures.

The apparatus of Figure 1 comprises freezing or crystallizing means A, a filtering means B, a reflux zone C, a melting section D, and a pulsation-producing device E.

A feed mixture comprising two or more components, one of which is separable from the mixture by crystallization, enters the apparatus through inlet 2 and is forced by means of pump 3 into the chilling section A of the main purification column. The purification apparatus is composed of a cylindrical shell 4, to which is attached a cooling section which comprises a cylindrical shell 5. The shells 4 and 5 can be constructed of ordinary metal pipe and can be welded together at any desired angle, as indicated in the drawing; or they can be connected by flanges or by threads. Alternatively, they can be one single length of pipe which can be built in the form of an elbow at any desired angle. The particular angle shown in the drawing can vary within a very broad range or the entire apparatus can be straight.

The purification apparatus is closed by means of end members 6 and 7, which can be of any suitable form known in the art. Crystallization section A comprises, in addition to shell 5, a cooling jacket 8 having inlet 9 and outlet 10. Positioned within the crystallization section is an agitating or scraping means 11, which is designed to prevent the accumulation of solid material on the heat exchange surface. Scrapers 11 are suitably constructed of strips of metal or other suitable materials known in the art. They can be fabricated in the form of a helix, as indicated in the drawing, or can be straight. Any suitable number of scrapers 11 can be provided. They are mounted on a rotatable shaft 12 by means of members 13. Shaft 12 is axially positioned in shell 5 and is connected to any suitable source of power for rotating the scrapers, such power source not being shown in the drawing. Shaft 12 is suitably sealed in end member 6 by means of a packing gland of any desired type known in the art. Suitable cooling of the feed which enters shell 5 can be provided by adding a coolant through inlet 9 and withdrawing the coolant through outlet 10. Sufficient cooling in section A is provided so that a predetermined amount of solid crystals is produced, as subsequently discussed herein. The resulting crystal mass passes through purification chamber 4 and into filter section B.

As a general rule, the feed pump 3 is generally suitable for forcing the crystal mixture through the purification column. However, other means for propelling the mixture through the purification zone can be provided, as shown in the cited Schmidt reissue patent. Where such means, for example, a piston, is provided, it can be positioned upstream from section A or intermediate the chilling section A and purification section 4, or other suitable arrangements can be provided by those skilled in the art.

Filtration section B comprises a suitable filter medium 14 and an external shell 15, the latter being provided with an outlet pipe 16 for filtrate. Filter medium 14 can be of any desired type known in the art. For example, it can comprise a metallic screen, a sintered perforate metal member or a perforate metal member supporting a filter cloth. In any event, it is desirable that the filter member 14 be positioned integrally with respect to the shell 4.

Filtrate produced in filter zone B is removed from the system through outlet 16. The remaining crystal mass passes through reflux zone C wherein it is countercurrently contacted with liquid reflux produced as subsequently described.

As the crystal mass approaches heater 17 in melting section D, the crystals are melted. Heater 17 can be in the form of an electrical heater or a heat transfer coil through which a suitably heated fluid is pumped. Part of the melt produced by heater 17 is withdrawn through outlet pipe 18 as a purified product of the process. The remainder of the melt is forced back through reflux zone C to form reflux which effects crystal purification, the resulting liquid being drawn off through outlet 16, together with the filtrate. Although an internal heater 17 is shown, an external heater, for example, a heating jacket encompassing section D and provided with means for circulating a heating fluid therethrough, can be used, if desired.

The pulsation-producing member E comprises a cylinder 19 which is suitably attached to closure member 7 as, for example, by welding, and closure means 20, together with a reciprocatable piston 21. Piston 21 is suitably sealed in cylinder 19, for example, by means of rings 22, to prevent the leakage of melt from the purification zone. Reciprocation of piston 21 is produced, for example, by an electric motor 23, a belt 24, a crank means 25, and connecting rods 26, which can be sealed in closure member 20 by means of a packing gland. An outlet 27 is provided in closure member 20 to facilitate the reciprocation of piston 21 and can be connected to means, not shown, for recovery of any material which might escape from column 4 in case of failure of rings 22.

While the crystal mass is being advanced from chilling section A through filtration section B, reflux section C, and melting section D, piston 21 is reciprocated at a suitable rate, which is subsequently discussed herein, so that a pulsating pressure is exerted on the melt reflux which is intermittently forced back, countercurrently with respect to the crystal mass, through reflux zone C. In melt outlet 18 is positioned a check valve 28 to prevent the back flow of withdrawn melt into the crystal purification column.

It has been found that for efficient and satisfactory separation, the downstream end (with respect to crystal movement) of the crystal mass within the reflux section should be maintained in close proximity to or preferably in contact with heater 17. This is accomplished by controlling the rate at which melt is withdrawn from the melting zone in accordance with the temperature of the liquid in the melting zone. Preferably, this control is dependent upon the temperature of liquid which is adjacent and downstream crystalwise from heater 17. In the purification of para-xylene, it has been found to be desirable to maintain the temperature of the liquid between about 56° F. and 80° F. Accordingly, there is provided a temperature recorder-controller, designated in the drawing as TRC, which is connected to a suitable temperature sensitive device, such as a thermocouple indicated by reference numeral 29. The thermocouple is preferably positioned within the purification column at a point immediately adjacent, but not in contact with, heater 17. The temperature recorder-controller is also operatively connected to a valve 30. The temperature recorder-controller is of any suitable design known in the art and can suitably comprise a device of known design for converting the electrical effect produced by thermocouple 29 to an air pressure which is utilized to open or close valve 30. The temperature recorder-controller is initially given an index setting corresponding to the temperature which it is desired to be maintained in the melting zone adjacent heater 17. When an undesirably rapid advance of crystals through reflux zone C results in a temperature, as measured by thermocouple 29, below that of the set temperature, the temperature recorder-controller operates to throttle valve 30 and decrease the rate of withdrawal of melt. An undesirably slow advance of crystals through the purification column produces the opposite effect, and the temperature recorder-controller operates valve 30 so as to increase the rate of withdrawal of melt. It is thus possible to control the location of the downstream end of the crystal mass within the reflux zone. As previously noted, the temperature in the melting zone is preferably controlled so that the downstream end of the crystal mass is maintained in contact with or adjacent heater 17. This method for adjusting the melt withdrawal rate is disclosed but not claimed in the previously cited Thomas application.

Also shown in the drawing is a cycle control device 31, of known design, which is operatively connected with motor 23 so that an electrical pulse is produced in synchronism with piston 21. The cycle control 31 can be so adjusted that, on the compression stroke of piston 21, an otherwise closed solenoid valve 32 is opened, resulting in the removal of filtrate from the purification column only on the compression stroke of piston 21. Also provided, to aid in accomplishing this effect, is check valve 33 in filtrate withdrawal line 16. A similar arrangement can be effected in connection with the withdrawal of melt through outlet 18. However, it is preferred, in such a case, that the melt withdrawal cease during the compression stroke of the piston. Means for producing this result are not shown in the drawing. Cycle control means 31 can, for example, be operatively connected to crank 25 or connecting rods 26. It can include an electrical make-and-break device, such devices being well known in the art.

It has been found that although the described synchronism of filtrate withdrawal with the compression stroke of piston 21 produces satisfactory results, it is not necessary for obtaining the benefits of the crystal purification apparatus described herein. A preferred arrangement of apparatus is to utilize by-pass 34, solenoid valve 32 and/or check valve 33 being closed and by-passed. In this mode of operation, a predetermined back pressure is maintained on the liquid being withdrawn from the filtering means through outlet 16. This back pressure is to be distinguished from that intermittently applied by the piston within the column. The filtrate or mother liquor back pressure is an external back pressure and can be constant; it need not be intermittent. For the purpose of controlling filtrate back pressure, a pressure indicator controller designated as PIC in line 16 can be utilized. This instrument is of a type well known in the art and converts a back pressure in liquid withdrawal line 16 to an air pressure which suitably throttles motor valve 35 to maintain a desired back pressure in line 16. It has been found that the purity of the product recovered from the melting zone can be controlled by adjusting the back pressure maintained on the liquid withdrawn through outlet 16. For example, in the purification of para-xylene, it has been found that there is a certain critical range of back pressure in which it is preferred to operate. When operating within this range, the purity of the product is high, e.g., above 99 percent, and any change in product purity resulting from variations in pressure within the range is small. Product purity declines, however, when the back pressure is increased or decreased so as to be outside of the aforementioned critical range. A similar instrument arrangement can be used in conjunction with valve 36 in melt withdrawal line 18. The foregoing external back pressure control is also disclosed but not claimed in the copending Thomas application.

It is also within the scope of this invention to withdraw melt through outlet 18 at a constant rate, utilizing metering equipment known in the art.

In the arrangement shown in Figure 2, the cylinder 20 is spaced from the cylinder 4 and is connected therewith by means of an open conduit 40.

In Figure 3, the piston 20 is separated from the contents of the purification column by means of an intermediate fluid which is supplied through valved conduit 50. The piston acts directly upon the intermediate fluid and, in turn, produces a pulsation of a flexible diaphragm 51, which is suitably sealed within a chamber 52. The intermediate fluid can be any non-corrosive fluid. It is preferably a liquid, such as a mineral lubricating oil or a vegetable oil, which is inert with respect to the materials being separated in column 4 and which is readily separable from said materials, in case it should inadvertently become mixed therewith. Diaphragm 51 can be protected from rupturing by providing a spring-biased relief valve (not shown) in line 50 between the inlet valve and chamber 52. Alternatively, diaphragm 51 can be actuated pneumatically, or by means of a direct, reciprocating, mechanical linkage attached to the diaphragm, or electrically, as by means of a solenoid, or by any other desired means for producing a reciprocating flexure. Also, the diaphragm can be placed in end member 7, e.g., concentrically therewith, or can replace end member 7, the melt being withdrawn from a side outlet. Further, the diaphragm can be sonically or supersonically, or even subsonically, vibrated.

Although purification chamber 4 is shown positioned horizontally, it can be operated in other positions; for example, it can be maintained in a vertical position with cylinder 20 and piston 21 at the top. This arrangement utilizes gravity as an aid to the flow of reflux.

Although, as stated, an additional piston can be utilized for propelling the crystals through the crystallization column, it has been found that such a device is ordinarily unnecessary, suitable propulsion being provided by a feed pump 3, especially when the purification column is horizontal or nearly horizontal. It is, however, within the scope of this invention to utilize two pistons, one to propel the crystals through the purification column and the other to produce a pulsating reflux stream. The latter piston is ordinarily operated at a frequency greater than that of the former, so that during a sustained movement of solids within a given time interval, an intermittent counterflow of reflux liquid is simultaneously effected.

A further suitable modification of the invention can be provided by positioning in reflux zone C a heat-transfer grid of the type shown in the copending application of T. A. Tarr, Serial No. 477,099, filed December 22, 1954, now U.S. Patent No. 2,874,199, granted February 17, 1959.

It has been found that certain ranges of frequency of pulsation of the back-pressure applied according to this invention produces results superior to certain other ranges of frequency. In the separation of paraxylene from its isomers, improved results are obtainable at a frequency as low as 15 pulsations per minute or as high as 200 pulsations per minute. However, outstanding results are obtained at from 50 to 165 pulsations per minute. Highly superior results are obtained in the range from 125 to 150 pulsations per minute. It has been found that within the preferred range the operation of the purification column is greatly stabilized and the movement of material therethrough is greatly facilitated. Thus, the attainment and maintenance of phase equilibrium, as indicated by temperature gradients within the column, is greatly facilitated by the use of pulsating back-pressure and reflux flow according to this invention. As regards production of a high-purity product consistently over an extended period of time, a critical lower limit of frequency exists at about 50 pulsations per minute in the purification of para-xylene. Broadly, however, the invention is not so limited.

The dimensions of the cylinder and piston used to produce the back-pressure pulsation can vary over a rather wide range. It has been found that when a purification column 6 inches in diameter is used in conjunction with a two inch diameter piston for the separation of para-xylene from its isomers, the piston stroke can be in the range ½ to 2½ inches, preferably ¾ to 2 inches, and it has been found that a 1-inch stroke appears to produce optimum results in terms of ease and stability of operation. Optimum dimensions in any particular case can readily be determined by trial by those skilled in the art. It is to be understood that the dimensions, configurations, and frequencies stated above are not necessarily optimum for every material to be purified.

As previously described, it has been found desirable to maintain a predetermined back pressure on the filtrate withdrawal conduit. It appears that, by controlling the back pressure, the proportion of solids in the material entering the reflux zone is, in turn, controlled. A back pressure in the range of 70 to 150 p.s.i. has been found highly desirable in the purification of para-xylene. Furthermore, it has been found that the purity of the product recovered from the melting zone can be controlled by adjusting the back pressure on the filtrate withdrawal conduit.

It is often desirable to control the relative proportions of solid and liquid in the feed which is introduced into the purification column. It is generally desired that this proportion be such that the mixture has sufficient of the properties of a liquid or slurry to allow transfer of the mixture by pumping. On the other hand, it is generally desirable to have sufficient solids present so that the mixture has some apparent compressibility; otherwise a water-hammer effect is sometimes produced by the action of the means provided to produce a pulsating back-pressure. The optimum ratio of solids to liquid depends on the particular materials to be separated, on crystal size, and on other factors and can readily be determined in any particular case by routine test. As a general rule, the solids content of the mixture fed from the chiller into the purification column is within the range 20 to 36 weight percent, and preferably 25 to 30 weight percent. However, solids contents outside the stated ranges can be used.

Although the back-pressure within the purification column is preferably applied by the piston or other pulsator in a regular or periodic or pulsating manner, an irregular or non-periodic increase of back-pressure is within the scope of the invention. It is also within the scope of the invention to operate with a compression stroke of the pulsator which is of longer duration than the return stroke or vice versa. This can be effected by suitable mechanical lost-motion devices connected with the means used to connect the piston or other pulsator to the source of motive power. Such devices are well known in the art. Also, electrical, pneumatic or hydraulic actuation of the pulsating mechanism can be utilized in place of purely mechanical actuation.

It is also within the scope of the invention to utilize two or more purification units, of the type described, in series. This type of operation is of particular value when the raw material from which it is desired to concentrate a particular component is relatively dilute with respect to that component. For example, in a hydrocarbon mixture containing approximately 18 weight percent para-xylene together with other xylenes and ethylbenzene, the raw mixture can be passed through a purification unit of the type described in Figure 1 to produce a concentrate containing, for example, 60 weight percent para-xylene, which concentrate can then be passed, after at least partial melting, if desired, to a second unit of the type shown in Figure 1. The first unit can be operated with or without the use of pulsating back-pressure, a pulsating back-pressure being used in the second unit. More than two such units can be used in series. Alternatively, the preliminary concentration can be accomplished by crystallization and subsequent filtration, although this method is not necessarily equivalent to the use of two or more pulsator-equipped units in series as previously described.

The use of parallel arrangements of two or more units of the type described is also within the scope of the invention. Combinations of series and parallel arrangements are also feasible.

From the foregoing it is apparent that a pressure in the melting zone of an apparatus of the type described is intermittently produced which pressure is greater than that at the locus of filtrate withdrawal and an intermittent reflux flow is thus created simultaneously with the propulsion of solids through the apparatus. It will be seen that, according to this invention, a predetermined back pressure is maintained on the liquid removed from the filtering means and that melt is removed from the melting zone at a rate such as to maintain a predetermined temperature within that zone.

In the following examples, the operation of a crystal purification apparatus in accordance with this invention is illustrated in connection with the separation and purification of para-xylene from a mixture of para-xylene with ortho- and meta-xylenes and ethylbenzene.

EXAMPLE I

The purification unit utilized in these examples was of the type illustrated in Figure 1. The purification column was constructed of flanged steel pipe 6 inches in diameter and approximately 2½ feet in length, the column being horizontally positioned. Connected to one end of the column was a 6 inch diameter scraped-surface chiller, 20 feet in length and connected to the column by means of flanges at an angle of 8° 40' with the horizontal. The chiller was provided with a jacket through which coolant was circulated. Within the chiller was a scraper of the type illustrated in Figure 1. Adjacent the end of the column to which the chiller was connected was a wall filter 10 inches long, with a filtrate withdrawal conduit. In the opposite end of the purification column was positioned an electrical heater approximately 6 to 8 inches from the product outlet end. A product withdrawal conduit was connected to the melting end of the column. This end of the column was provided with a flange to which was connected a 2-inch diameter cylinder provided with a piston, as illustrated in Figure 1. The 2-inch piston was driven by means of a mechanical linkage with a rotary electric motor, said linkage being such that the piston stroke and the rate of reciprocation could be varied over a rather broad range. A commercially available temperature recorder-controller was provided for measuring the temperature at the electrical heater within the column and controlling the product withdrawal rate, in response to said temperature, by control of a valve in the melt withdrawal line. The thermocouple associated with the temperature recorder-controller was positioned in the column downstream from and immediately adjacent, but not in contact with, heater 17. The controller was operated to keep the downstream end of the crystal mass in contact with the electrical heater. Thus, if crystals melted upstream from the heater, the withdrawal rate was automatically increased, and if crystals moved past the heater, the withdrawal rate was automatically decreased. A pressure controller and motor valve were used to regulate the back pressure on the filtrate withdrawal line. During some of the runs, a solenoid valve positioned in the filtrate withdrawal line was synchronized with the 2-inch piston by means of a microswitch actuated by a cam attached to the cylinder connecting rod. Thus, when the piston was moving in a direction opposite to that of crystal movement, the solenoid valve in the filtrate line opened so that filtrate was withdrawn; on the opposite stroke of the piston, the solenoid valve closed, and no filtrate was removed.

A feed comprising 60 weight percent para-xylene, the impurities being chiefly ortho- and meta-xylene and ethyl benzene, was supplied to the chiller. Representative data obtained under different conditions are shown in the following tables.

*Table I*

OPERATING DATA 6-INCH DIAMETER, HORIZONTAL, PULSED COLUMN WITH 60 PERCENT p-XYLENE FEED—FRACTIONAL CRYSTALLIZATION

| Period of Operation, Hr. | Temperatures, °F. | | | Pressures, p.s.i.g.[1] | | | | Heat, Watts |
|---|---|---|---|---|---|---|---|---|
| | Chiller Outlet | Wall Liquor | Heater Section | Chiller Feed | Chiller Outlet | Column ML | Product | |
| 2 | 3 | 5–7 | 67–73 | 100 | 115 | 100 | 120 | 2,610 |
| 2 | 2–4 | 4–10 | 69–72 | 92–95 | 105 | 95 | 110 | 2,610 |
| 2 | 4–5 | 5–9 | 67–72 | 90 | 105 | 95 | 110 | 2,610 |
| 3 | 4–5 | 6–10 | 66–73 | 87–90 | 105 | 95 | 110 | 2,610 |
| 3.5 | 4–5 | 5–7 | 68–73 | 96–110 | 110 | 105 | 125 | 2,610 |
| 1.5 | 5 | 5–6 | 67–70 | 120–130 | 115 | 100 | 135 | 2,610 |
| 1 | 4–5 | 4–6 | 71 | 130–145 | 120 | 95 | 130 | 2,610 |
| 1.5 | 3–5 | 4–6 | 70–74 | 150–157 | 120 | 90 | 130 | 2,610 |
| 2.5 | 3–5 | 3–5 | 70–74 | 100 | 110 | 105 | 125 | 2,610 |
| 2 | −1 to +2 | −1 to +3 | 69–71 | 100 | 115 | 100 | 115 | 2,610 |
| 2 | −3 to −5 | −1 to −4 | 67–73 | 100 | 105 | 95 | 110 | 2,610 |
| 3 | −8 to −9 | −7 | 67–76 | 100 | 95 | 100 | 100 | 2,610 |
| 1.5 | 5–7 | 6–7 | 66–71 | 100 | 110 | 105 | 120 | 2,610 |
| 1 | 8–10 | 8–10 | 69–70 | 95 | 115 | 105 | 125 | 2,660 |
| 1 | 10–11 | 10–11 | 67–72 | 95 | 115 | 105 | 125 | 2,660 |

| Period of Operation, Hr. | Pulse Piston | | Rates, g.p.h. | | Calculated Slurry Quality, Wt percent Solids | Stream Compositions, mol percent p-Xylene | | |
|---|---|---|---|---|---|---|---|---|
| | Stroke, In. | Cycles, Min. | Product | ML | | Feed | ML | Composite Product |
| 2 | 1 | 140 | 11.9–13.8 | 42–46 | 27.5 | 60 | 47 | 98.5–99.1 |
| 2 | 1 | 140 | 12.4–14.9 | 40–46 | 27.5 | 60 | 47 | 98.9 |
| 2 | 1 | 140 | 12.8–13.3 | 39–43 | 26.0 | 60 | 47 | 98.3–98.9 |
| 3 | 1 | 140 | 12.5–14.4 | 37–44 | 26.0 | 60 | 47 | 97.6–98.9 |
| 3.5 | 1 | 140 | 14.3–15.8 | 37–40 | 26.0 | 60 | 46 | 98.9–99.6 |
| 1.5 | 1 | 140 | 14.5–15.4 | 34–38 | 25.5 | 59 | 46 | 99.4–99.6 |
| 1 | 1 | 140 | 15.5 | 37–39 | 26.0 | 59 | 46 | 99.5 |
| 1.5 | 1 | 140 | 14.1–15.5 | 36–40 | 26.5 | 60 | 46 | 99.5–99.6 |
| 2.5 | 1 | 140 | 14.0–15.4 | 37–40 | 26.5 | 60 | 46 | 99.5–99.6 |
| 2 | 1 | 140 | 14.0–15.0 | 33–38 | 30.0 | 60 | 42–44 | 98.9–99.3 |
| 2 | 1 | 140 | 14.0–14.2 | 26–31 | 33.5 | 59 | 39–42 | 99.0–99.1 |
| 3 | 1 | 140 | 14.2–14.9 | 22–24 | 36.5 | 60 | 35–37 | 97.4–98.9 |
| 1.5 | 1 | 140 | 14.3–18.1 | 38–43 | 24.5 | 60 | 45–47 | 98.4–99.0 |
| 1 | 1 | 140 | 14.0–14.6 | 47–52 | 20.5 | 60 | 48–50 | 98.5–99.0 |
| 1 | 1 | 140 | 14.9–15.7 | 56–59 | 19.0 | 60 | 49–50 | 96.7–97.8 |

[1] Column pressures cycle with the pulse piston cycle. Gauges were snubbed; hence, they tend to record average pressures. Average pressures are shown in the table.
ML=mother liquor.

*Table II*

RESULTS OF TESTS OF CONTROL DEVICES 6-INCH DIAMETER, HORIZONTAL, PULSED COLUMN WITH 60 PERCENT p-XYLENE FEED FRACTIONAL CRYSTALLIZATION

| Duration of Run, Hr. | Temperature, °F. | | | Pressures, p.s.i.g. | | | Heat, Watts | Pulse Piston | | Rates, g.p.h. | | Stream Compositions, Mol percent p-xylene | | | Notes |
|---|---|---|---|---|---|---|---|---|---|---|---|---|---|---|---|
| | Chiller Outlet | Wall Liquor | Heater Section | Chiller Outlet | ML | Product | | Stroke, In. | Cycles/min. | Product | ML | Feed | ML | Composite Product | |
| 1.5 | 3–6 | 3–7 | 68–70 | 100 | 95 | 115 | 2,660 | 1 | 140 | 14.3–14.5 | | 60 | 44 | 98.5–99.2 | |
| 1.5 | 2 | 2–3 | 69–70 | 95 | 90 | 100 | 2,610 | 1 | 140 | 13.2–14.5 | 20–31 | 60 | 44 | 99–2–99.5 | (a) |
| 1.5 | 2–3 | 3 | 69–74 | 90 | 90 | 100 | 2,610 | 1 | 140 | 13.4–14.3 | 30–32 | 60 | 44 | 99.5 | (a) (b) |
| 1.5 | 1 | 1–2 | 69–73 | 90 | 80 | 100 | 2,610 | 1 | 140 | 13.6–14.0 | 30–31 | 60 | 44 | 99.3–99.4 | (a) (b) (c) |
| 7.5 | 1–2 | 1–2 | 73–80 | 95 | 85 | 100 | 2,610 | 1 | 140 | 12.8–14.0 | 29–36 | 60 | 44 | 99.1–99.2 | (a) (b) (c) |
| 4 | 0–2 | 1–2 | 75–82 | 95 | 80 | 100 | 2,610 | 1 | 140 | 12.9–13.6 | 28–32 | 60 | 43 | 99.0–99.7 | (a) (b) (c) (d) |
| 3 | 1 | 1–2 | 76–79 | 105 | 80 | 115 | 2,610 | 1 | 140 | 13.4–13.8 | 33–34 | 60 | 44 | 98.4–99.3 | (a) (b) (d) |
| 2.5 | 1 | 2 | 75–78 | 100 | 85 | 110 | 2,690–2,995 | 1 | 140 | 13.9–15.6 | 34–36 | 60 | 43 | 98.9–99.4 | (a) (b) (d) |
| 2 | 1 | 2 | 81–85 | 100 | 85 | 110 | 3,095–3,275 | 1 | 140 | 15.2–16.3 | 36–39 | 60 | 42 | 98.1–98.4 | (a) (b) (d) |
| 3.5 | 0–3 | 1–3 | 81–85 | 100 | 80 | 110 | 3,335–3,590 | 1 | 140 | 15.5–17.5 | 36–44 | 60 | 42 | 98.0–98.5 | (a) (b) (d) |
| 4.5 | −1 to +1 | −1 to +2 | 81–85 | 90 | 70 | 100 | 3,690–3,795 | 1 | 140 | 17.5–18.5 | 33–43 | 60 | 42 | 98.0–99.0 | (a) (b) (d) |
| 2.5 | 1–2 | 1–3 | 83–85 | 90 | 65 | 100 | 3,860–3,995 | 1 | 140 | 18.7–19.7 | 44–49 | 60 | 43 | 98.5–99.1 | (a) (b) (d) |
| 4 | 2–3 | 3–5 | 77–86 | 90 | 55 | 100 | 4,055–4,195 | 1 | 140 | 19.7–21.6 | 49–62 | 60 | 44 | 97.9–99.0 | (a) (b) (d) |

Notes:
(a) Chiller feed surge pot was bypassed.
(b) The mother liquor solenoid valve, used on cycle control in phase with piston motion, was bypassed.
(c) The check valve on the mother liquor line from the column was bypassed.
(d) A back-pressure control and motor valve were used in place of an integral back-pressure regulator used in other runs.

Table III

OPERATING DATA 6-INCH DIAMETER, HORIZONTAL, PULSED COLUMN 60 PERCENT p-XYLENE FEED FRACTIONAL CRYSTALLIZATION

| Duration of Run, Hr. | Temperatures, °F. | | | Pressures, p.s.i.g. | | | Heat, Watts | Pulse Piston | | Rates, g.p.h. | | Stream Composition, Mol percent p-Xylene | | |
|---|---|---|---|---|---|---|---|---|---|---|---|---|---|---|
| | Chiller Outlet | Wall Liquor | Heater Section | Chiller Outlet | ML | Product | | Stroke, In. | Cycles, Min. | Product | ML | Feed | ML | Composite Product |
| 1.5 | 0-2 | 2-4 | 67-70 | 90 | 85 | 90 | 2,645 | 7/8 | 140 | 12.8-13.3 | 41-45 | 58 | 46 | 98.4-99.0 |
| 3.5 | 2-5 | 4-6 | 61-70 | 90 | 90 | 90 | 2,130-2,645 | 5/8 | 140 | 9.7-13.8 | 23-50 | 58 | 47 | 91.5-98.5 |
| 4.5 | 0.2 | 1.6 | 67-82 | 80 | 80 | 90 | 2,130-2,810 | 3/4 | 140 | 11.4-15.1 | 28-40 | 59 | 45 | 96.2-97.6 |
| 3.5 | 1-3 | 2-4 | 80-86 | 80 | 80 | 85 | 2,750-2,945 | 3/4 | 140 | 12.6-14.8 | 32-37 | 60 | 44 | 98.9-99.1 |
| 1 | 2 | 4 | 68-70 | 85 | 85 | 90 | 2,995 | 3/4 | 140 | 14.7-15.0 | 38 | 60 | 44-48 | 94.1-98.9 |
| 4 | 1-5 | 2-5 | 66-79 | 95 | 90 | 95 | 2,765 | 1 1/8 | 140 | 12.9-24.8 | 30-38 | 60 | 44 | 98.1-98.6 |
| 4.5 | 1-3 | 3-5 | 66-78 | 100 | 80 | 105 | 2,575 | 1 1/4 | 140 | 11.4-14.9 | 31-39 | 60 | 44 | 98.0-99.5 |
| 2.5 | 3-4 | 5-7 | 72-82 | 105 | 85 | 105 | 2,590 | 3/4 | 160 | 10.2-12.9 | 38-44 | 60 | 45 | 98.0-99.5 |
| 2 | 3-4 | 6-25 | 76-82 | 105 | 90 | 115 | 2,590 | 3/4 | 160 | 11.6-13.0 | 40-44 | 60 | 45 | 98.0-98.9 |
| 2 | 1-2 | 1-4 | 74-85 | 95 | 80 | 95 | 2,390 | 1 1/8 | 128 | 8.9-11.9 | 27-31 | 61 | 44 | 98.1-98.6 |
| 3.5 | 1-2 | 4-5 | 73-79 | 105 | 90 | 105 | 2,440 | 1 1/8 | 128 | 10.6-12.7 | 32-34 | 61 | 45 | 98.0-98.5 |
| 5.5 | 1 | 2-5 | 73-77 | 105 | 85 | 110 | 2,160 | 1 1/8 | 128 | 9.5-10.8 | 28-32 | 60 | 45 | 98.4-98.9 |
| 6.5 | 1-2 | 2-5 | 56-61 | 105 | 90 | 105 | 1,880 | 7/8 | 128 | 8.8-11.1 | 27-31 | 60 | 45 | 98.0-99.1 |

The foregoing data show that good results were obtained at a pulsation frequency of approximately 125 to 160 pulsations per minute. A frequency of 140 pulsations per minute appeared to be optimum. It will be noted that throughput rates of the order of 35 to 36 gallons per hour were readily maintainable with the 6-inch diameter column. This is equal to rates which are consistently attained in an 8-inch diameter column in commercial operation without the pulsation feature of this invention. Thus, it is clear that this invention provides high throughputs, stable operation and high product purity.

EXAMPLE II

In a system of the type described in Example I, further data were obtained showing the results of varying certain other process variables. A temperature recorder-controller was used to control the rate of product withdrawal. A pressure controller and motor valve were used to regulate the back pressure on the mother liquor withdrawal line.

The foregoing data show that a back-pressure on the filtrate withdrawal line in the range 75 to 115 p.s.i. is highly desirable in the described purification of para-xylene. Product purity was 99.7 percent para-xylene at 75 p.s.i. Product purity declined gradually as the mother liquor back pressure was increased, but remained above 99 percent until a back pressure of about 115 to 120 p.s.i. was reached. Product purity decreased rather rapidly at a back pressure of 120 p.s.i, but purity exceeding 99 percent para-xylene was quickly recovered by reduction of the back pressure Heater section temperature was varied between 53° F. and 97° F. Product purity remained above 99 percent para-xylene at heater section temperatures between 56° F. and 80° F. Product purities were reduced at heater section temperatures of 56° F. and below, and also declined at temperatures above 80° F.

The data for which no times are given represent individual readings in runs varying in length from several hours to several days.

From the foregoing, it will be seen that I have provided an improved method for controlling a process and apparatus in which solids, especially crystals, are moved through a crystal purification column having an intermediate filter section and a melting section with a reflux section therebetween, a varying or pulsating back pressure being applied to the contents of the system simultaneously with the moving of the solids into the filter

Table VI

6-INCH DIAMETER, HORIZONTAL, PULSED COLUMN 60 PER CENT p-XYLENE FEED

| Duration of Run, Hr. | Temperature, °F. | | | Pressure, p.s.i.g.[1] | | | | Heat, Watts | Rate, cycles/min. | Stroke, In. | Flow Rates g.p.h. | | Stream Compositions, Mol percent p-Xylene | | |
|---|---|---|---|---|---|---|---|---|---|---|---|---|---|---|---|
| | Chiller Outlet | Wall Liquor | Heater Section | Chiller In | Chiller Out | Column ML | Column Product | | | | Product | ML | Feed | ML | Composite Product |
| 3.5 | 0-1 | 0-1 | 73-81 | 90 | 85 | 65 | 150 | 3,160-3,850 | 160 | 15/16 | 12.8-18.4 | 30-46 | 57 | 41-44 | 94.7-96.2 |
| 3 | 4 | 4-5 | 66-74 | 110 | 70 | 35 | 175 | 2,260-2,320 | 160 | 1 1/4 | 11.6-14.1 | 34-43 | 56 | 43-44 | 94.7-97.1 |
| 4.5 | 0 to +21 | 1-3 | 69-72 | 115 | 110 | 85 | 100 | 2,590 | 140 | 1 | 12.9-13.5 | 38-40 | 56 | 43-44 | 98.0-99.2 |
| 3.5 | 0-1 | −1 to +1 | 68-68 | 120 | 120 | 80 | 115 | 2,590 | 140 | 1 | 11.8-15.8 | 30-49 | 57 | 41-43 | 99.3-99.9 |
| 5.5 | 6-7 | 7-9 | 63-69 | 115 | 120 | 100 | 120 | 3,080-3,320 | 140 | 1 | 16.0-16.9 | 54-60 | 60 | 46-47 | 98.2-98.7 |
| 7.5 | 3-4 | 4-6 | 60-71 | 105 | 120 | 80 | 120 | [2] 4,150 | 140 | 1 | 20.4-21.9 | 58-62 | 60 | 46-47 | 98.5-98.9 |
| | 4 | 5 | 56 | 105 | 120 | 80 | 120 | [2] 4,150 | 140 | 1 | 23.2 | 65.2 | 60 | 47 | 96.1 |
| | 4 | 6 | 67 | 105 | 125 | 80 | 115 | [2] 4,150 | 140 | 1 | 19.7 | 57.8 | 60 | 46 | 98.4 |
| | 3 | 3 | 80 | 95 | 105 | 80 | 120 | [2] 4,150 | 140 | 1 | 19.0 | 51.1 | 60 | 46 | 99.1 |
| | 4 | 6 | 97 | 105 | 120 | 80 | 110 | [2] 4,150 | 140 | 1 | 17.6 | 52.4 | 60 | 46 | 98.0 |
| | 3 | 4 | 71 | 110 | 90 | 80 | 105 | 2,610 | 140 | 1 | [3] 13.0 | 36.9 | 59 | 44 | 99.3 |
| | 3 | 3 | 58 | 110 | 100 | 80 | 125 | 2,610 | 140 | 1 | [3] 13.8 | 39.8 | 59 | 45 | 99.3 |
| | 4 | 4 | 53 | 110 | 100 | 80 | 110 | 2,610 | 140 | 1 | [3] 15.6 | 45.0 | 59 | 45 | 98.0 |
| | 4 | 4 | 75 | 100 | 90 | 75 | 95 | 2,610 | 140 | 1 | 12.1 | 32.7 | 60 | 42 | 99.5 |
| | 4 | 4 | 74 | 110 | 100 | 90 | 110 | 2,610 | 140 | 1 | 12.6 | 31.3 | 60 | 42 | 99.6 |
| | 4 | 5 | 74 | 110 | 100 | 100 | 95 | 2,610 | 140 | 1 | 13.0 | 33.7 | 60 | 45 | 99.0 |
| | 5 | 5 | 73 | 120 | 120 | 110 | 130 | 2,610 | 140 | 1 | 13.2 | 33.3 | 60 | 46 | 99.1 |
| | 4 | 5 | 75 | 125 | 120 | 115 | 130 | 2,610 | 140 | 1 | 12.7 | 30.8 | 60 | 45 | 98.6 |
| | 4 | 5 | 70 | 125 | 125 | 120 | 130 | 2,610 | 140 | 1 | 12.8 | 35.4 | 60 | 46 | 92.7 |
| | 4 | 4 | 76 | 125 | 120 | 105 | 125 | 2,610 | 140 | 1 | 12.4 | 33.8 | 60 | 45 | 99.5 |
| | 4 | 5 | 73 | 110 | 100 | 80 | 100 | 2,610 | 140 | 1 | 12.5 | 34.6 | 60 | 45 | 99.3 |

Notes:
[1] System pressures cycle at the same rate as the pulse unit. Gauges are snubbed and tend to indicate average pressures.
[2] Maximum heating rate with installed heater.
[3] Estimated.

section. Variation and modification within the scope of the disclosure and the claims can readily be effected by those skilled in the art. While certain process steps, examples and structures have been described for purposes of illustration, it is clear that the invention is not limited thereto.

I claim:

1. In a process wherein a body of solids is moved through a stationary filter zone, wherein liquid is removed, a reflux zone and a solids melting zone; solids are melted in said melting zone, part of the melt being removed from the system and another part being forced in a direction countercurrent to the direction of movement of solids; and the materials in said zones are subjected to an intermittent back-pressure simultaneously with the described movement of said solids, the improvement which comprises maintaining a predetermined back-pressure on the liquid removed from said filter zone; measuring the temperature of melt within said melting zone; and controlling the rate at which melt is removed from said melting zone in response to said temperature measurement.

2. In a process which comprises passing a slurry of crystals in mother liquor into a stationary filter zone, withdrawing mother liquor from said filter zone, moving the resulting mass into a reflux zone, moving said crystal mass through said reflux zone into a melting zone, melting crystals in said melting zone, passing a portion of the resulting melt countercurrently to the direction of movement of crystals in said reflux zone, removing the remainder of said melt as purified product, and subjecting materials in said zones to a pulsating back-pressure applied to said melting zone, the improvement which comprises maintaining a predetermined back-pressure on the mother liquor withdrawn from said filter zone; obtaining a signal proportional to the temperature of melt within said melting zone; and controlling the rate of product withdrawal in response to said signal.

3. A process for separating a component from a liquid multi-component mixture which comprises introducing said mixture into a cooling zone; cooling said mixture in said cooling zone so as to crystallize at least a portion of one of the components of said mixture; passing the resulting slurry of crystals in mother liquor into a stationary filtering zone; withdrawing mother liquor from said filtering zone; maintaining a predetermined back-pressure on the mother liquor withdrawn from said filtering zone; passing the resulting crystal mass from said filtering zone through a reflux zone and into a melting zone; melting crystals in said melting zone; withdrawing melt from said melting zone as a product of the process; measuring the temperature of said melt in the upstream end, with respect to crystal movement, of said melting zone; controlling the rate at which melt is withdrawn from said melting zone in response to said temperature measurement; passing the remainder of the melt into said reflux zone in a direction countercurrent to the movement of crystals therethrough; and applying a pulsating pressure to the melt in said melting zone.

4. The process of claim 3 in which said multi-component mixture comprises alkylbenzenes.

5. The process of claim 4 in which said mixture contains para-xylene and said para-xylene is recovered as the product.

6. The process of claim 5 in which the rate at which melt is withdrawn from said melting zone is controlled so as to maintain a temperature between about 56° F. and about 80° F. in the upstream end thereof.

7. The process of claim 5 in which a back-pressure between about 75 and 115 p.s.i.g. is maintained on the mother liquor withdrawn from said filtering means.

8. The process of claim 3 in which said multi-component mixture comprises benzene and a paraffinic hydrocarbon, and benzene is recovered as the product.

9. The process of claim 3 in which said multi-component mixture comprises cyclohexane and a paraffinic hydrocarbon, and cyclohexane is recovered as the product.

10. A process which comprises chilling a fruit juice to obtain a solids content in the range of 20 to 36 weight percent, said solids comprising essentially ice crystals; passing the resulting mixture through a stationary filtering zone; removing liquid from said filtering zone as a product of the process; maintaining a predetermined back-pressure on the liquid removed from said filtering zone; passing the remaining solids through a reflux zone and into a melting zone; melting solids in said zone; removing part of the molten material from said melting zone; measuring the temperature of molten material in the upstream end, with respect to solids movement, of said melting zone; controlling the rate at which said molten material is removed from said melting zone in response to said temperature measurement; passing the remainder of said molten material into said reflux zone in a direction countercurrent to the movement of solids therethrough; and subjecting the molten material in said melting zone to a pulsating back-pressure.

11. In crystal purification apparatus comprising a purification chamber, stationary filtration means positioned within said purification chamber, means for withdrawing liquid from said filtration means, melting means positioned within one end of said purification chamber, melt withdrawal means connected to said end of said purification chamber, flow control means associated with said melt withdrawal means means to propel solids through said purification chamber in a direction from said filtration means toward said melting means, and means for producing an intermittent pressure increase in said chamber, the improvement which comprises means for maintaining a predetermined back-pressure on the liquid withdrawn from said filtration means; temperature measuring means disposed within said purification chamber adjacent said melting means; and temperature control means, said means being operatively connected to said flow control means and to said temperature measuring means.

12. In a crystal purification apparatus which comprises a cooling chamber surrounded by a jacket, coolant inlet and outlet means connected to said jacket, a purification chamber in open communication with said cooling chamber, stationary filtration means positioned in said purification chamber, liquid outlet means connected to said filtration means, inlet means connected to the end of said cooling chamber opposite said purification chamber, melting means positioned in the end of said purification chamber opposite said cooling chamber, melt outlet means connected to said end of said purification chamber; means for propelling a mixture of solids and liquid from said cooling chamber through said purification chamber toward said melting means, and means for producing a pulsating back-pressure in said purification chamber, the improvement which comprises a first flow control means in said liquid outlet means connected to said filtration means; a pressure control means, said means being operatively connected to said first flow control means and to said liquid outlet means; a second flow control means in said melt outlet means; temperature measuring means disposed within said purification chamber adjacent said melting means; and temperature control means, said means being operatively connected to said second flow control means and to said temperature measuring means.

13. Crystal purification apparatus comprising, in combination, a chiller; feed inlet conduit means connected to said chiller; a purification chamber in open communication with said chiller; stationary filtering means disposed in said purification chamber; a liquid outlet conduit connected to said filtering means; melting means disposed in the end of said purification chamber opposite said chiller; a melt outlet conduit connected to said end of said purification chamber; means for propelling a mixture of solids and liquid from said cooling chamber through said purification chamber toward said melting means; a cylinder in open communication with a part of said purification chamber adjacent said melting means; a reciprocating piston in said cylinder; means for reciprocating said piston within said cylinder; a first flow control means in said liquid outlet conduit connected to said filtering means; a by-pass line connected to said liquid outlet conduit on either side of said first flow control means; a second flow control means in said by-pass line; a cycle control means, said means being operatively connected to said reciprocating means and to said first flow control means; a third flow control means disposed in said liquid outlet conduit downstream from the juncture of said conduit with said by-pass line; a pressure control means, said means being operatively connected to said liquid outlet conduit and to said third flow control means; a fourth flow control means in said melt outlet conduit; temperature means disposed within said purification chamber adjacent said melting means; and temperature control means, said means being operatively connected to said second fourth flow control means and to said temperature measuring means.

14. In crystal purification apparatus comprising a purification chamber, stationary filtration means positioned within said purification chamber, means for withdrawing liquid from said filtration means, melting means positioned within one end of said purification chamber, melt withdrawal means connected to said end of said purification chamber, means to propel solids through said purification chamber in a direction from said filtration means toward said melting means, and means for producing an intermittent pressure increase in said purification chamber, the improvement which comprises a first flow control means in said means for withdrawing liquid from said filtration means; a pressure control means, said means being operatively connected to said first flow control means and to said means for withdrawing liquid from said filtration means; a second flow control means in said melt withdrawal means; temperature measuring means disposed within said purification chamber adjacent said melting means; and temperature control means, said means being operatively connected to said second flow control means and to said temperature measuring means.

15. In a process wherein a body of solids is moved through a stationary liquid removal zone, wherein liquid is removed, a reflux zone, and a solids melting zone; solids are melted in said melting zone, part of the melt being removed from the melting zone and another part being forced in a direction countercurrent to the direction of movement of solids in said reflux zone; and the materials in said zones are subjected to an intermittent back-pressure simultaneously with the described movement of said solids, the improvement which comprises controlling the back-pressure on the liquid removed from said liquid removal zone so as to maintain same in the range of 70 to 150 p.s.i. and thereby control the proportion of solids entering said reflux zone.

References Cited in the file of this patent

UNITED STATES PATENTS

| | | |
|---|---|---|
| 2,615,794 | Shelby | Oct. 28, 1952 |
| 2,617,274 | Schmidt | Nov. 11, 1952 |
| 2,683,178 | Findlay | July 6, 1954 |
| 2,750,433 | Le Tourneau et al. | June 12, 1956 |
| 2,794,840 | Vela | June 4, 1957 |
| 2,835,598 | Kolner | May 20, 1958 |